(12) United States Patent
Nakamura

(10) Patent No.: US 12,510,349 B2
(45) Date of Patent: Dec. 30, 2025

(54) METHOD OF DETECTING ABNORMALITY IN MEASURING OF FILM THICKNESS OF WORKPIECE, OPTICAL FILM-THICKNESS MEASURING APPARATUS, AND STORAGE MEDIUM STORING PROGRAM

(71) Applicant: EBARA CORPORATION, Tokyo (JP)

(72) Inventor: Akira Nakamura, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 292 days.

(21) Appl. No.: 18/371,357

(22) Filed: Sep. 21, 2023

(65) Prior Publication Data

US 2024/0102791 A1 Mar. 28, 2024

(30) Foreign Application Priority Data

Sep. 28, 2022 (JP) .................................. 2022-155025

(51) Int. Cl.
*G01B 11/06* (2006.01)
*B24B 49/12* (2006.01)

(52) U.S. Cl.
CPC .......... *G01B 11/0625* (2013.01); *B24B 49/12* (2013.01)

(58) Field of Classification Search
CPC .......... B24B 49/12; H01L 22/12; H01L 22/26
See application file for complete search history.

(56) References Cited

U.S. PATENT DOCUMENTS

2023/0063102 A1* 3/2023 Lin ........................ G01B 21/02

FOREIGN PATENT DOCUMENTS

JP 2003-312892 A 11/2003
JP 2020-053550 A 4/2020

* cited by examiner

*Primary Examiner* — Thanh Luu
(74) *Attorney, Agent, or Firm* — BakerHostetler

(57) ABSTRACT

A technique of detecting an abnormality in measuring of a film thickness of a workpiece, such as a wafer, is disclosed. A method includes: generating multiple spectra of reflected light from multiple measurement points on a workpiece over a predetermined period of time during polishing of the workpiece; classifying the multiple spectra into a plurality of groups including at least a first group and a second group according to feature of each of the multiple spectra; determining a monitoring index value based on at least the number of spectra included in the first group; and detecting an abnormality in measuring of the film thickness of the at least one workpiece based on comparison of the monitoring index value with a threshold value.

10 Claims, 10 Drawing Sheets

METHOD OF DETECTING ABNORMALITY IN MEASURING OF FILM THICKNESS OF WORKPIECE, OPTICAL FILM-THICKNESS MEASURING APPARATUS, AND STORAGE MEDIUM STORING PROGRAM

CROSS REFERENCE TO RELATED APPLICATION

This document claims priority to Japanese Patent Application No. 2022-155025 filed Sep. 28, 2022, the entire contents of which are hereby incorporated by reference.

BACKGROUND

In a manufacturing process of a semiconductor device, various materials are repeatedly formed in film shapes on a silicon wafer to form a multilayer structure. In order to form such multilayer structure, a technique of planarizing a surface of an uppermost layer of the multilayer structure is becoming important. Chemical mechanical polishing (CMP) is used as one of such planarizing techniques.

The chemical mechanical polishing (CMP) is performed by a polishing apparatus. This type of polishing apparatus generally includes a polishing table that supports a polishing pad, a polishing head configured to hold a wafer having a film, and a polishing-liquid supply nozzle configured to supply a polishing liquid (for example, slurry) onto the polishing pad. The polishing apparatus is configured to rotate the polishing head and polishing table individually, while supplying the polishing liquid from the polishing-liquid supply nozzle onto the polishing pad. The polishing head presses the surface of the wafer against the polishing pad in the presence of the polishing liquid between the wafer and the polishing pad to polish the film that constitutes the surface of the wafer.

In order to measure a thickness of a non-metal film, such as a dielectric film or a silicon layer (hereinafter which will be simply refereed to film thickness), the polishing apparatus generally includes an optical film-thickness measuring device. This optical film-thickness measuring device is configured to direct light, emitted by a light source, to the surface of the wafer and analyze a spectrum of reflected light from the wafer to determine a film thickness of the wafer.

With miniaturization of semiconductor device structures, a performance required for the optical film-thickness measuring device is becoming higher and higher. The optical film-thickness measuring device has a plurality of parameters for adjusting its function. If these parameters are not properly adjusted or set, the optical film-thickness measuring device will not be able to measure the film thickness of the wafer correctly. In addition, if the optical film-thickness measuring device itself has a malfunction, the optical film-thickness measuring device cannot correctly measure the film thickness of the wafer.

The above-described parameters of the optical film-thickness measuring device are adjusted in advance based on a surface structure of the wafer. However, different types of wafers to be measured have different surface structures, and as a result, the optical film-thickness measuring device cannot correctly measure film thicknesses of these wafers.

SUMMARY

Thus, if there is an abnormality in measuring of the film thickness of the wafer, the polishing apparatus cannot polish the wafer correctly. Accordingly, there is provided a technique for detecting an abnormality in measuring of a film thickness of a workpiece, such as a wafer.

Embodiments, which will be described below, relate to polishing of a workpiece having interconnect structures on its surface, such as wafer, interconnect substrate, quadrilateral substrate, etc., and in particular to a technique for detecting an abnormality in measuring of a thickness of the workpiece based on multiple spectra of reflected light from the workpiece.

In an embodiment, there is provided a method of detecting an abnormality in measuring of a film thickness of a workpiece, comprising: generating, by an optical film-thickness measuring apparatus, multiple spectra of reflected light from multiple measurement points on at least one workpiece over a predetermined period of time during polishing of the at least one workpiece; classifying the multiple spectra into a plurality of groups including at least a first group and a second group according to feature of each of the multiple spectra; determining a monitoring index value based on at least the number of spectra included in the first group; and detecting an abnormality in measuring of the film thickness of the at least one workpiece based on comparison of the monitoring index value with a threshold value.

In an embodiment, the spectra included in the first group are one of spectra of reflected light from an interconnect pattern region formed on a surface of the at least one workpiece and noise spectra, and spectra included in the second group 2 are other of the spectra of reflected light from the interconnect pattern region and the noise spectra.

In an embodiment, the method further comprises: generating multiple sample spectra of reflected light from multiple measurement points of a sample while polishing the sample having the same surface structure as the at least one workpiece; performing clustering on the multiple sample spectra to classify the multiple sample spectra into sample groups; creating a spectrum classifier based on features of the multiple sample spectra that have been classified into the sample groups, the spectrum classifier being configured to classify a new spectrum according to a feature of the new spectrum into one of sample groups including at least a first sample group and a second sample group; and determining the threshold value based on the number of sample spectra included in at least the first sample group.

In an embodiment, classifying the multiple spectra into the plurality of groups including at least the first group and the second group according to the feature of each of the multiple spectra comprises classifying the multiple spectra by the spectrum classifier into the plurality of groups including at least the first group and the second group.

In an embodiment, the monitoring index value is one of the number of spectra included in the first group, a ratio of the number of spectra included in the first group to the number of spectra included in the second group, a ratio of the number of spectra included in the second group to the number of spectra included in the first group, and a ratio of the number of spectra included in the first group to the total number of spectra generated in the predetermined period of time.

In an embodiment, the predetermined period of time during polishing of the at least one workpiece is an entirety or a part of a period of time from start of polishing of the at least one workpiece to end of polishing of the at least one workpiece.

In an embodiment, the predetermined period of time during polishing of the at least one workpiece is an entire period of polishing of a plurality of workpieces.

In an embodiment, the threshold value changes during polishing of the at least one workpiece.

The spectrum varies depending on the surface structure of the workpiece. For example, a spectrum of reflected light from an interconnect pattern region on a surface of a workpiece and a spectrum of reflected light from a scribe line on the surface of the workpiece have different shapes. The multiple spectra of the reflected light are classified into the plurality of groups based on the feature of each spectrum (for example, the shape of the spectrum or the intensity data of the reflected light shown in the spectrum).

During polishing of the workpiece, the surface structure of the workpiece itself does not change. Therefore, the number of spectra included in the first group sorted by clustering is generally constant during polishing of the workpiece. However, if a failure occurs in the optical film-thickness measuring apparatus, the spectra generated may change, resulting in a change in the number of spectra included in the first group. If the workpiece being polished has a surface structure different from an expected surface structure, the number of spectra included in the first group may change as well.

Therefore, the monitoring index value that has been determined based on at least the number of spectra included in the first group can be used as an index for determining an abnormality in measuring of the film thickness. According to the above-described embodiments, an abnormality in measuring of the film thickness can be accurately detected based on the comparison between the monitoring index value and the threshold value.

DESCRIPTION OF EMBODIMENTS

Figure 1:
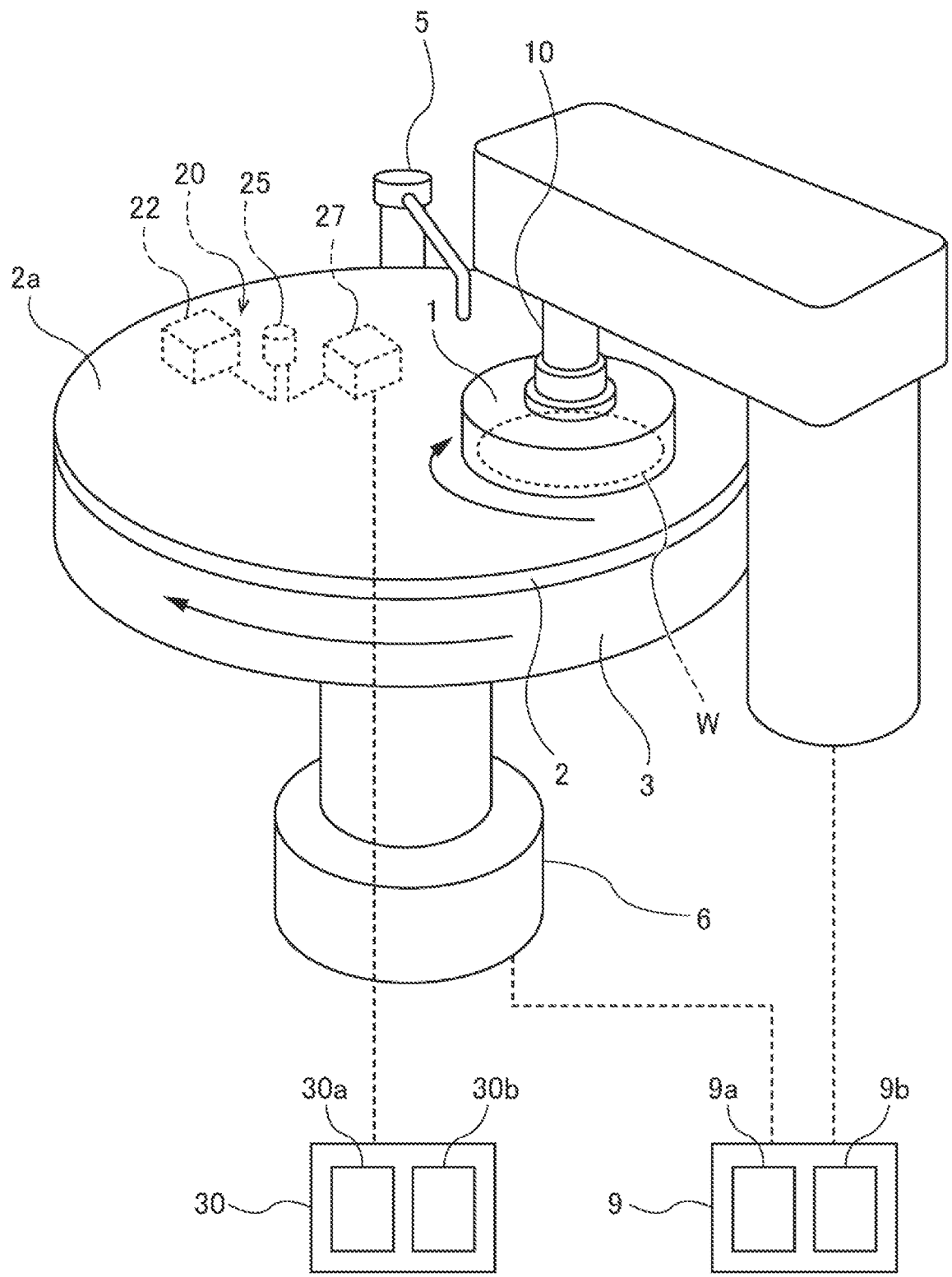
FIG. 1 is a schematic view showing an embodiment of a polishing apparatus.

Hereinafter, embodiments will be described with reference to the drawings. FIG. 1 is a schematic view showing an embodiment of a polishing apparatus. As shown in FIG. 1, the polishing apparatus includes a polishing table 3 that supports a polishing pad 2, a polishing head 1 configured to press a workpiece W against the polishing pad 2, a table motor 6 configured to rotate the polishing table 3, a polishing-liquid supply nozzle 5 configured to supply a polishing liquid, such as slurry, onto the polishing pad 2, and an operation controller 9 configured to control operations of the polishing apparatus. The polishing pad 2 has an upper surface that constitutes a polishing surface 2a for polishing the workpiece W. The workpiece W has a film forming an interconnect structure on a surface of the workpiece W. Examples of the workpiece W include a wafer, an interconnect substrate, a quadrilateral substrate used in manufacturing of semiconductor devices.

The polishing head 1 is coupled to a head shaft 10, which is coupled to a polishing-head motor (now shown). The polishing head motor is configured to rotate the polishing head 1 together with the head shaft 10 in a direction indicated by an arrow. The polishing table 3 is coupled to the table motor 6, which is configured to rotate the polishing table 3 and the polishing pad 2 in a direction indicated by an arrow. The polishing head 1, the polishing head motor, and the table motor 6 are coupled to the operation controller 9.

Polishing of the workpiece W is performed as follows. The polishing-liquid supply nozzle 5 supplies the polishing liquid onto the polishing surface 2a of the polishing pad 2 on the polishing table 3, while the polishing table 3 and the polishing head 1 are rotated in the directions indicated by the arrows in FIG. 1. While the workpiece W is being rotated by the polishing head 1, the workpiece W is pressed by the polishing head 1 against the polishing surface 2a of the polishing pad 2 in the presence of the polishing liquid on the polishing pad 2. The surface of the workpiece W is polished by a chemical action of the polishing liquid and a mechanical action of abrasive grains contained in the polishing liquid and the polishing pad 2.

The operation controller 9 includes a memory 9a storing programs therein, and an arithmetic device 9b configured to execute arithmetic operations according to instructions included in the programs. The operation controller 9 is composed of at least one computer. The programs may be stored in a computer-readable storage medium which is a non-transitory tangible medium. The programs may be provided to at least one computer constituting the operation controller 9 via the storage medium. Examples of the storage medium include an optical disk (e.g., CD-ROM, DVD-ROM) and a semiconductor memory (e.g., USB flash drive, memory card). The memory 9a includes a main memory, such as a random access memory (RAM), and an auxiliary memory, such as a hard disk drive (HDD) or solid state drive (SSD). Examples of the arithmetic device 9b include a CPU (central processing unit) and a GPU (graphic processing unit). However, the specific configurations of the operation controller 9 are not limited to these examples.

The polishing apparatus includes an optical film-thickness measuring apparatus 20 configured to measure a thickness of a film of the workpiece W. The optical film-thickness measuring apparatus 20 includes a light source 22 configured to emit light, an optical sensor head 25 configured to irradiate the workpiece W with the light from the light source 22 and receive reflected light from the workpiece W, a spectrometer 27 coupled to the optical sensor head 25, and a processing system 30 configured to determine the thickness of the film of the workpiece W based on a spectrum of the reflected light from the workpiece W. The optical sensor head 25 is arranged in the polishing table 3 and rotates together with the polishing table 3.

The processing system 30 includes a memory 30a storing programs therein, and an arithmetic device 30b configured to execute arithmetic operations according to instructions included in the programs. The processing system 30 is composed of at least one computer. The programs may be stored in a computer-readable storage medium which is a non-transitory tangible medium. The programs may be provided to at least one computer constituting the processing system 30 via the storage medium. Examples of the storage medium include an optical disk (e.g., CD-ROM, DVD-ROM) and a semiconductor memory (e.g., USB flash drive, memory card). The memory 30a includes a main memory, such as a random access memory (RAM), and an auxiliary memory, such as a hard disk drive (HDD) or solid state drive (SSD). Examples of the arithmetic device 30b include a CPU (central processing unit) and a GPU (graphic processing unit). However, the specific configurations of the processing system 30 are not limited to these examples.

Each of the operation controller 9 and the processing system 30 may be comprised of a plurality of computers. For example, each of the operation controller 9 and the processing system 30 may be a combination of edge server and cloud server. In one embodiment, the operation controller 9 and the processing system 30 may be constituted of a single computer.

Figure 2:
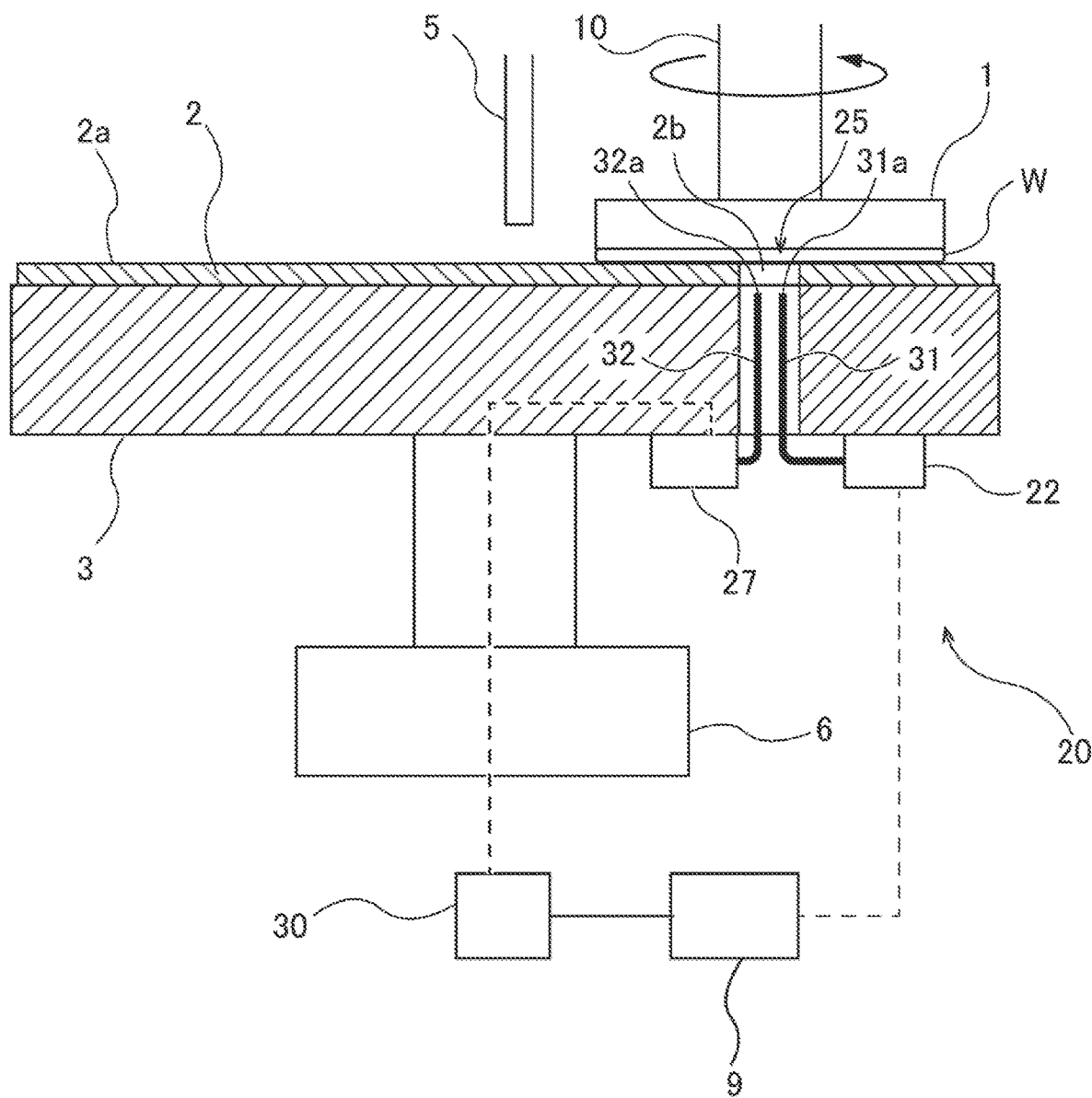
FIG. 2 is a cross-sectional view showing a detailed configuration of an optical film-thickness measuring device.

FIG. 2 is a cross-sectional view showing a detailed configuration of the optical film-thickness measuring apparatus 20. The optical film-thickness measuring apparatus 20 includes a light-emitting optical fiber cable 31 coupled to the light source 22 and a light-receiving optical fiber cable 32 coupled to the spectrometer 27. A distal end 31a of the light-emitting optical fiber cable 31 and a distal end 32a of the light-receiving optical fiber cable 32 constitute the optical sensor head 25. Specifically, the light-emitting optical fiber cable 31 directs the light, emitted by the light source 22, to the workpiece W on the polishing pad 2, and the light-receiving optical fiber cable 32 receives the reflected light from the workpiece W and transmits the reflected light to the spectrometer 27.

The spectrometer 27 is coupled to the processing system 30. The light-emitting optical fiber cable 31, the light-receiving optical fiber cable 32, the light source 22, and the spectrometer 27 are mounted to the polishing table 3 and rotate together with the polishing table 3 and the polishing pad 2. The optical sensor head 25, composed of the distal end 31a of the light-emitting optical fiber cable 31 and the distal end 32a of the light-receiving optical fiber cable 32, is arranged so as to face the surface of the workpiece W on the polishing pad 2. The position of the optical sensor head 25 is such that the optical sensor head 25 traverses the surface of the workpiece W on the polishing pad 2 each time the polishing table 3 and polishing pad 2 make one rotation. The polishing pad 2 has a through-hole 2b located above the optical sensor head 25. The optical sensor head 25 irradiates the workpiece W with the light through the through-hole 2b and receives the reflected light from the workpiece W through the through-hole 2b each time the polishing table 3 makes one rotation.

The light source 22 may be a flash light source configured to repeatedly emit light at short time intervals. Examples of the light source 22 include xenon flash lamp. The light source 22 is electrically coupled to the operation controller 9 and emits the light upon receiving a trigger signal sent from the operation controller 9. More specifically, while the optical sensor head 25 sweeps across the surface of the workpiece W on the polishing pad 2, the light source 22 receives multiple trigger signals and emits the light multiple times. Therefore, multiple measurement points on the workpiece W are irradiated with the light each time the polishing table 3 makes one rotation.

The light emitted by the light source 22 is transmitted to the optical sensor head 25. Specifically, the light is transmitted through the light-emitting optical fiber cable 31 to the optical sensor head 25 and emitted from the optical sensor head 25. The light is incident on the workpiece W on the polishing pad 2 through the through-hole 2b of the polishing pad 2. The reflected light from the workpiece W passes through the through-hole 2b of the polishing pad 2 again and is received by the optical sensor head 25. The reflected light from the workpiece W is transmitted through light-receiving optical fiber cable 32 to the spectrometer 27.

The spectrometer 27 is configured to decompose the reflected light according to wavelengths and to measure intensity of the reflected light at each of the wavelengths over a predetermined wavelength range. Specifically, the spectrometer 27 decomposes the reflected light from the workpiece W according to wavelengths and measures the intensity of the reflected light at each of the wavelengths over the predetermined wavelength range to thereby generate light intensity measurement data. The intensity of the reflected light at each wavelength may be expressed as a relative value, such as reflectance or relative reflectance. The light intensity measurement data is sent to the processing system 30.

Figure 3:
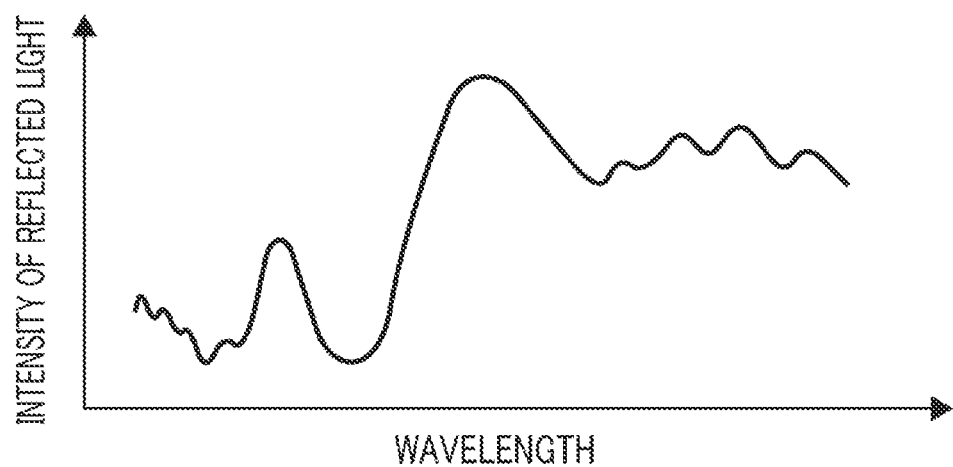
FIG. 3 is a diagram showing a spectrum generated from light intensity measurement data.

The processing system 30 produces a spectrum, as shown in FIG. 3, from the light intensity measurement data. The spectrum of the reflected light from the workpiece W contains information about the film thickness of the workpiece W. In other words, the spectrum of the reflected light changes depending on the film thickness of the workpiece W. The processing system 30 is configured to determine the film thickness of workpiece W based on the spectrum of the reflected light.

Known technique may be used for determining the film thickness of the workpiece W based on the spectrum. For example, the processing system 30 determines, from a reference spectra library, a reference spectrum having a shape that is most similar to a shape of the spectrum of the reflected light and determines a film thickness associated with the determined reference spectrum. In another example, the processing system 30 performs a Fourier transform on the spectrum of the reflected light and determines a film thickness from a resultant frequency spectrum.

The processing system 30 has a function of detecting an abnormality in measuring of the film thickness of the workpiece W. The abnormality in measuring of the film thickness can occur due to a variety of causes. For example, if parameters that determine the operation of the optical film-thickness measuring apparatus 20 are not properly adjusted or set, or if there is a malfunction in an optical system of the optical film-thickness measuring apparatus 20, or if the workpiece W has a surface structure that is different from an expected surface structure, the optical film-thickness measuring apparatus 20 cannot measure the film thickness correctly.

Therefore, the processing system 30 detects an abnormality in measuring of the film thickness of the workpiece W while measuring the film thickness based on the spectrum of the reflected light from the workpiece W as described above. The details are as follows.

The processing system 30 generates multiple spectra of reflected light from multiple measurement points on the workpiece W over a predetermined period of time during polishing of the workpiece W. Examples of the predetermined period of time during polishing of the workpiece W include a period during which the polishing table 3 makes N rotation(s) (N is a natural number), an entire period from the start of polishing of the workpiece W to the end of polishing of the workpiece W, and a part of the entire period from the start of polishing of the workpiece W to the end of polishing of the workpiece W. The processing system 30 determines the film thickness of the workpiece W based on the spectrum of the reflected light produced at each point in time during polishing of workpiece W.

In one embodiment, a plurality of workpieces may be polished and multiple spectra of reflected light generated during the entire polishing of the plurality of workpieces may be used.

The processing system 30 classifies the multiple spectra, generated within the predetermined period of time, into a plurality of groups according to feature of each of the multiple spectra. Examples of the feature of each spectrum include a shape of each spectrum or intensity data of the reflected light shown in each spectrum. In this embodiment, the processing system 30 includes a spectrum classifier which will be described below, and is configured to classify the multiple spectra into the plurality of groups by the spectrum classifier.

Figure 4:
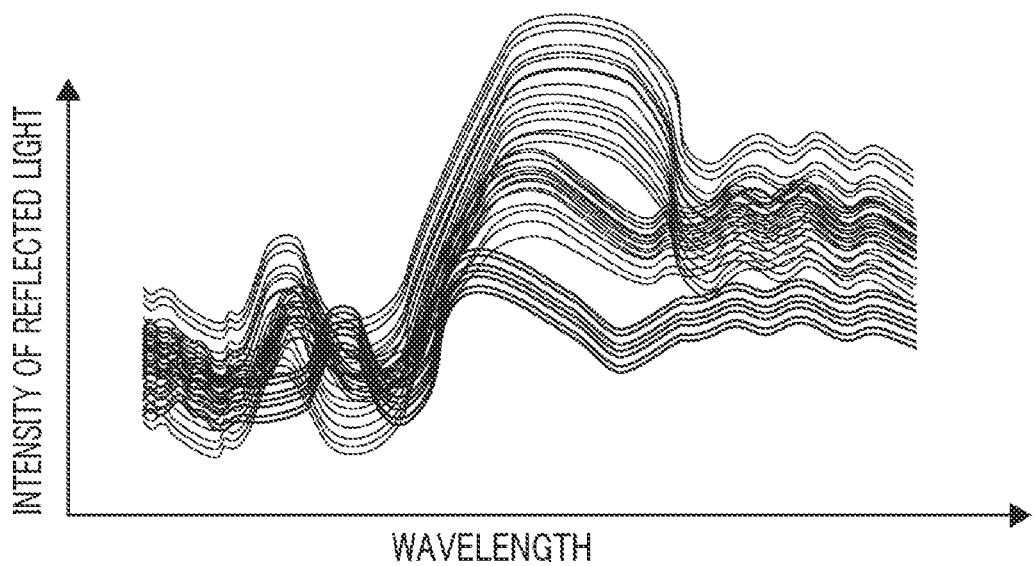
FIG. 4 is a graph showing multiple spectra generated in a predetermined period of time during polishing of a workpiece.

FIG. 4 is a graph showing multiple spectra generated in the predetermined period of time during polishing of the workpiece W. In FIG. 4, a vertical axis represents the intensity of the reflected light from the workpiece W, and a horizontal axis represents the wavelength of the reflected light. The intensity of the reflected light may be expressed as a relative value, such as reflectance or relative reflectance. In general, the spectrum changes with the change in the film thickness of the workpiece W. On the other hand, the spectrum varies depending on the surface structure of the workpiece W. Specifically, during polishing of the workpiece W, the light is directed to the multiple measurement points on the surface of the workpiece W and the spectra of the reflected light from these multiple measurement points are generated. The multiple measurement points are distributed across the workpiece W.

Figure 5:
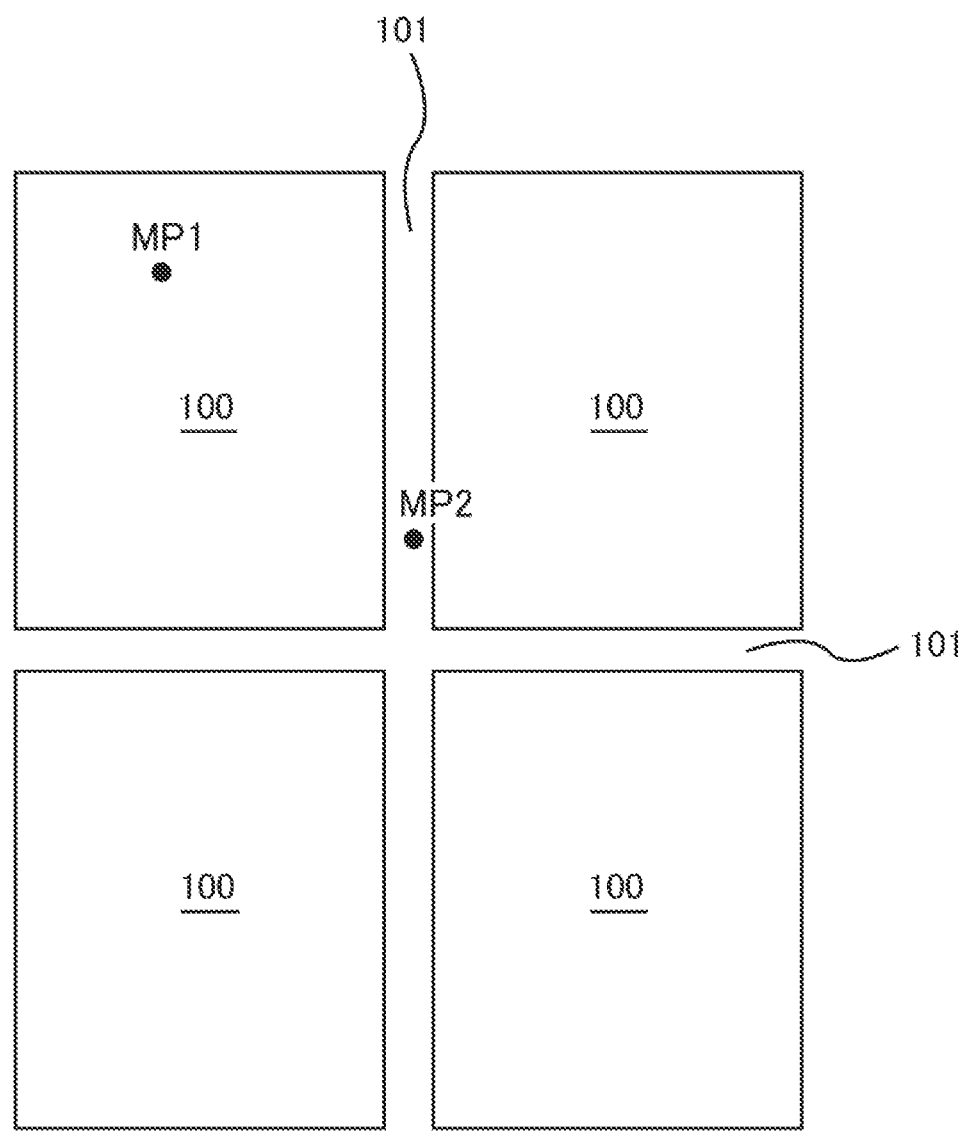
FIG. 5 is a schematic diagram showing an example of a part of a surface structure of a workpiece.

FIG. 5 is a schematic diagram showing an example of a part of the surface of the workpiece W. The surface of the workpiece W has a plurality of interconnect pattern regions 100 (which may be called cells) in which interconnect patterns are formed, and scribe lines 101 existing between the interconnect pattern regions 100. A spectrum of the reflected light from a measurement point MP1 within the interconnect pattern region 100 has a shape different from a spectrum of the reflected light from a measurement point MP2 within the scribe line 101. Thus, the multiple spectra generated within the predetermined period of time during polishing of the workpiece W vary depending on the locations of these measurement points.

In addition, the multiple spectra generated within the predetermined period of time during polishing of the workpiece W further includes noise spectra. The noise spectra are noises generated due to various causes, and each noise spectrum does not correctly reflect the film thickness. These noise spectra have shapes different from those of both the spectrum of the reflected light from the interconnect pattern region 100 and the spectrum of the reflected light from the scribe line 101.

Therefore, the multiple spectra shown in FIG. 4 include the spectra of the reflected light from the interconnect pattern regions 100, the spectra of the reflected light from the scribe lines 101, and the noise spectra. The processing system 30 classifies the multiple spectra generated within the predetermined period of time during polishing of workpiece W into group G1, group G2, and group G3 according to their features. In this embodiment, the group G1 is a group of spectra of the reflected light from the interconnect pattern regions 100, the group G2 is a group of spectra of the reflected light from the scribe lines 101, and the group G3 is a group of noise spectra.

Figure 6:
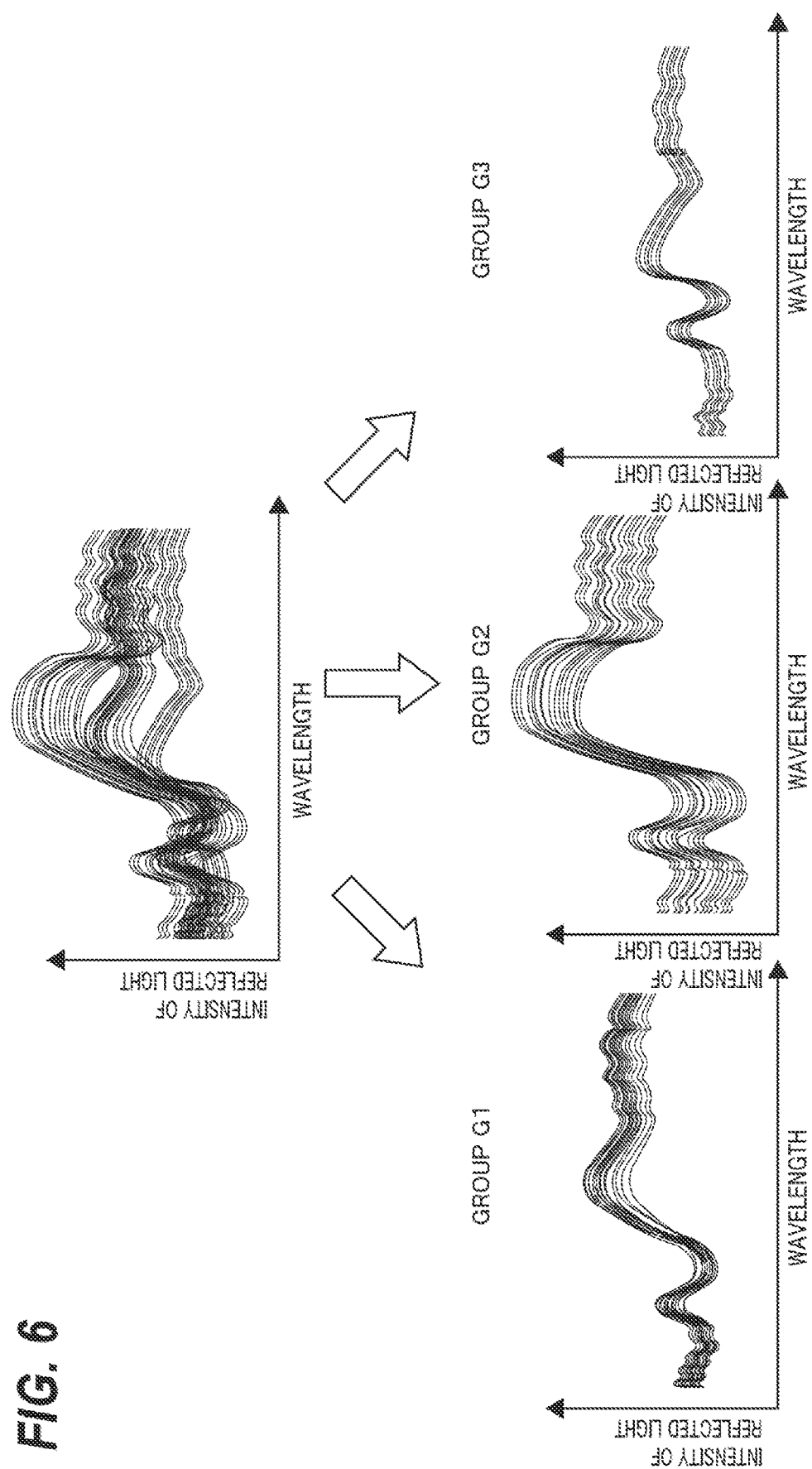
FIG. 6 is a diagram in which the multiple spectra shown in FIG. 4 are classified into three groups.

FIG. 6 is a diagram in which the multiple spectra shown in FIG. 4 are classified into the groups G1, G2, and G3. The processing system 30 classifies the multiple spectra into the group G1, the group G2, and the group G3 based on the feature of each spectrum (e.g., the shape of the spectrum or the intensity data of the reflected light shown in the spectrum), as shown in FIG. 6. It is noted that, depending on the surface structure of the workpiece W, the multiple spectra may be classified into two groups, or four or more groups.

Figure 7:
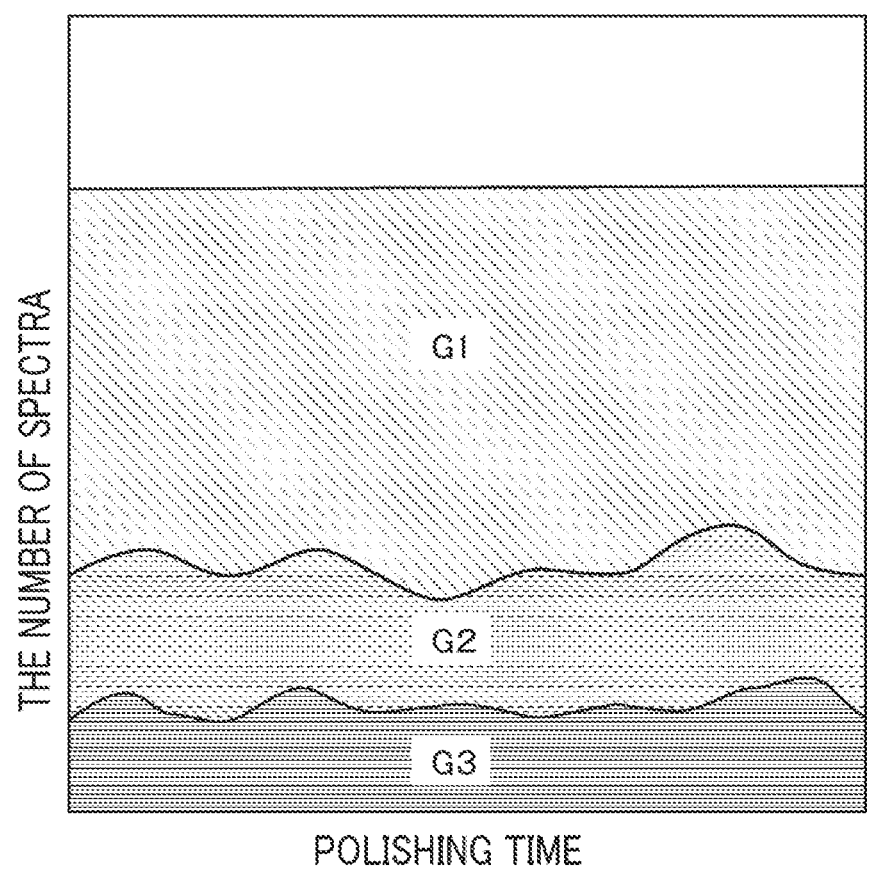
FIG. 7 is a graph showing an example of the number of spectra in each of the three groups when the optical film-thickness measuring device is in a normal condition.

The processing system 30 counts the number of spectra contained in each of the group G1, the group G2, and the group G3. FIG. 7 is a graph showing an example of the number of spectra in each of the groups G1, G2, and G3. In FIG. 7, a vertical axis represents the number of spectra, and a horizontal axis represents polishing time. During polishing of the workpiece W, the film thickness of the workpiece W changes, but the surface structure of the workpiece W itself does not change. Therefore, a ratio of the number of spectra included in group G1, group G2, and group G3 is determined depending on the surface structure of workpiece W.

However, if there is a malfunction in the optical film-thickness measuring apparatus 20 (for example, a malfunction in the optical fiber cable), the generated spectrum changes, and as a result, the number of multiple spectra included in the group G1 changes. If the workpiece W being polished has a different surface structure than the expected surface structure, the number of spectra included in the group G1 will likewise change.

Figure 8:
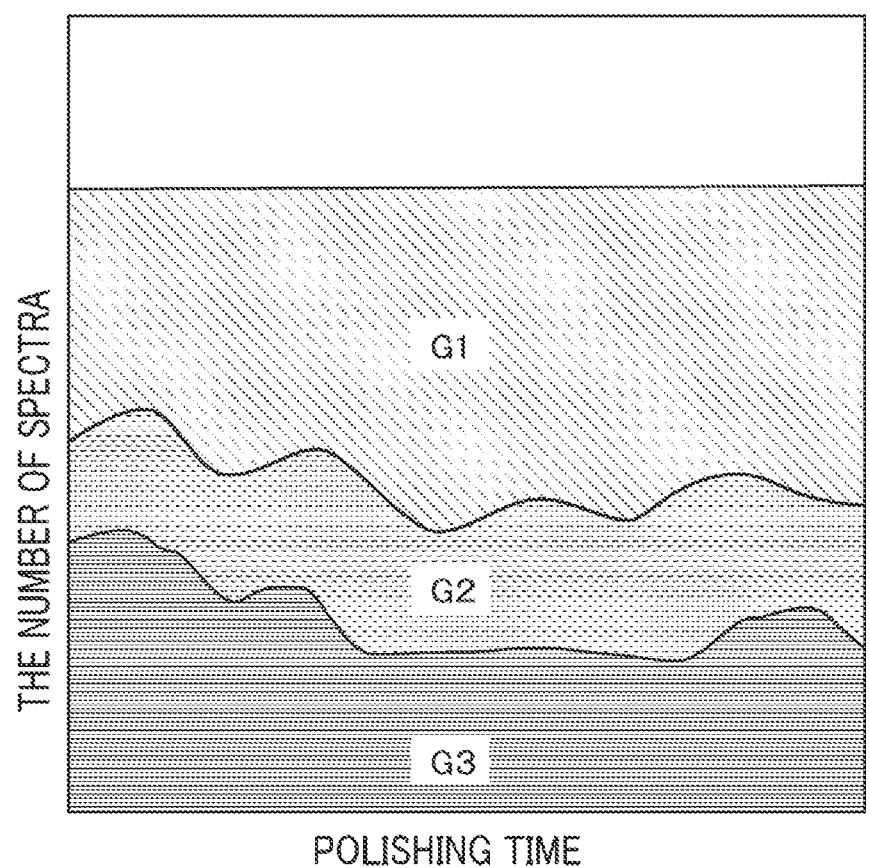
FIG. 8 is a graph showing an example of the number of spectra in each of the three groups when there is a malfunction in the optical film-thickness measuring device.

FIG. 8 is a graph showing an example of the number of spectra in each of the groups G1, G2, and G3 when the optical film-thickness measuring apparatus 20 has a malfunction. As shown in FIG. 8, due to the malfunction of the optical film-thickness measuring apparatus 20, the number of spectra in the group G1 decreases, while the number of noise spectra in the group G3 increases. In this way, when the optical film-thickness measuring apparatus 20 malfunctions, the number of spectra in the group G1 and the number of spectra in the group G3 change from those in the normal condition of the optical film-thickness measuring apparatus 20. As a result, the optical film-thickness measuring apparatus 20 cannot measure the film thickness of the workpiece W correctly. The same issue will occur when the parameters that determine the operation of the optical film-thickness measuring apparatus 20 are not adjusted or set correctly, and when the workpiece W being polished has a surface structure different from an expected surface structure.

Thus, the processing system 30 determines a monitoring index value based on at least the number of spectra included in the group G1 and detects an abnormality in measuring of the film thickness of the workpiece W based on a comparison between the monitoring index value and a threshold value. The threshold value is a predetermined numerical value, as will be described later. In the example of FIG. 8, the number of spectra included in the group G1 has increased compared to that in the normal condition. Therefore, the monitoring index value determined based on the number of spectra included in the group G1 can be used as an index for determining an abnormality in measuring of the film thickness.

The monitoring index value is a numerical value that reflects a change in the number of spectra included in the group G1. Specific examples of the monitoring index value include the number of spectra included in the group G1, a ratio of the number of spectra included in the group G1 to the number of spectra included in the group G3, a ratio of the number of spectra included in the group G3 to the number of spectra included in the group G1, and a ratio of the number of spectra included in the group G1 to the total number of spectra generated in the predetermined period of time.

In one embodiment, as described below, the monitoring index value may be determined based on at least the number of spectra included in the group G3. In this case, specific examples of monitoring index value include the number of spectra included in the group G3, a ratio of the number of spectra included in the group G3 to the number of spectra included in the group G1, a ratio of the number of spectra included in the group G1 to the number of spectra included in the group G3, and a ratio of the number of spectra included in the group G3 to the total number of spectra generated in the predetermined period of time.

The processing system 30 is configured to detect an abnormality in measuring of the film thickness based on the comparison between the monitoring index value and threshold value. More specifically, the processing system 30 determines that there is an abnormality in measuring of the film thickness when the monitoring index value is below the threshold value or when the monitoring index value is above the threshold value.

Figure 9:
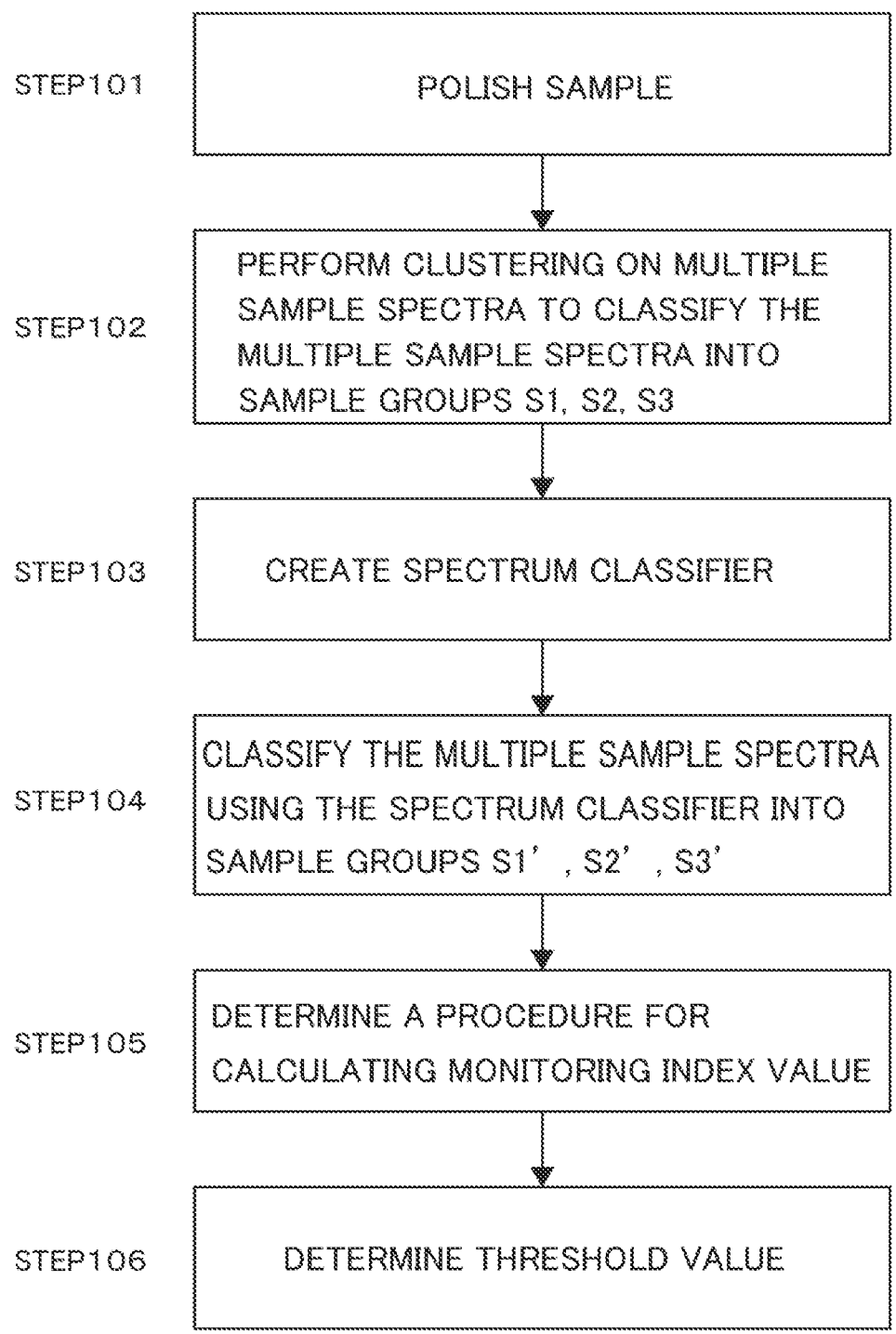
FIG. 9 is a flowchart illustrating an embodiment of a method of determining a threshold value that is compared with a monitoring index value.

An embodiment of a method of determining the threshold value that is compared with the monitoring index value will now be described with reference to a flowchart of FIG. 9.

In step 101 a sample having the same surface structure as that of the workpiece W is polished. A single sample may be polished, or a plurality of samples may be polished in order to increase the accuracy of detecting an abnormality of measuring a film thickness.

In step 102, the processing system 30 performs clustering on multiple sample spectra generated during polishing of the sample to classify the multiple sample spectra into a sample group S1, a sample group S2, and a sample group S3. The clustering is unsupervised machine learning that classifies the multiple sample spectra according to their features. The clustering may be called cluster analysis or data classification method.

In step 103, the processing system 30 creates a spectrum classifier based on the features of the multiple sample spectra that have been classified into the sample group S1, the sample group S2, and the sample group S3. This spectrum classifier is configured to classify (or sort) a new spectrum into one of the sample group S1, the sample group S2, and the sample group S3 according to a feature of the new spectrum. The spectrum classifier is stored in the memory 30a of the processing system 30.

The spectrum classifier is a device virtually constructed within the processing system 30, and its specific configuration (or algorithm) is not particularly limited as long as the spectrum classifier can perform the function described above. In one example, the processing system 30 determines a first range that includes features (e.g., shapes) of sample spectra belonging to the sample group S1, determines a second range that includes features (e.g., shapes) of sample spectra belonging to the sample group S2, determines a third range that includes features (e.g., shapes) of sample spectra belonging to the sample group S3, and creates the spectrum classifier configured to determine which of the first range, the second range, and the third range the feature of the new spectrum is included.

In one embodiment, the spectrum classifier may be a trained model constructed by machine learning. For example, the processing system 30 performs machine learning using the multiple sample spectra that have been classified into the sample group S1, the sample group S2, and the sample group S3 as training data to create the spectrum classifier that is a trained model.

In step 104, the processing system 30 classifies the multiple sample spectra obtained during polishing of the sample in the step 101 into a sample group S1', a sample group S2', and a sample group S3' by the spectrum classifier. Specifically, each of the multiple sample spectra is sorted into one of the sample group S1', the sample group S2', and the sample group S3' by the spectrum classifier. The sample group S1' contains spectra of the reflected light from interconnect pattern region(s) of the sample, the sample group S2' contains spectra of the reflected light from scribe line(s), and the sample group S3' contains noise spectra. The processing system 30 may create a graph showing a relationship between the number of spectra and polishing time, as discussed with reference to FIG. 7, based on the classification results using the spectrum classifier.

In step 105, a procedure for calculating (or determining) the monitoring index value based on the classification results using the spectrum classifier is determined. In one embodiment, the monitoring index value is determined (calculated) based on at least the number of sample spectra included in the sample group S1'. Specific examples of the procedure for calculating (determining) the monitoring index value include determining the number of sample spectra included in the sample group S1', determining a ratio of the number of sample spectra included in the sample group S1' to the number of sample spectra included in the sample group S3', determining a ratio of the number of sample spectra included in the sample group S3' to the number of sample spectra included in the sample group S1', and determining a ratio of the number of sample spectra included in the sample group S1' to the total number of sample spectra generated in the predetermined period of time.

In another embodiment, the monitoring index value may be determined (or calculated) based on at least the number of sample spectra included in the sample group S3'. As shown in FIGS. 7 and 8, when the optical film-thickness measuring apparatus 20 malfunctions, the number of noise spectra in the group G3 changes compared to when the optical film-thickness measuring apparatus 20 is in a normal condition. Accordingly, the processing system 30 may detect an abnormality in measuring of the film thickness of the workpiece W based on a comparison between the monitoring index value determined based on the number of noise spectra and the threshold value. In this case, specific examples of the procedure for calculating (determining) the monitoring index value include determining the number of sample spectra included in the sample group S3' determining a ratio of the number of sample spectra included in the sample group S3' to the number of sample spectra included in the sample group S1', determining a ratio of the number of sample spectra included in the sample group S1' to the number of sample spectra included in the sample group S3', and determining a ratio of the number of sample spectra included in the sample group S3' to the total number of sample spectra generated in the predetermined period of time.

In step 106, the processing system 30 uses at least one of the sample groups S1', S2', S3' to calculate (determine) the monitoring index value according to the procedure for calculation (determination) that has been determined in the step 105 and determines the threshold value based on the monitoring index value obtained. The threshold value may be the same numerical value as the calculated (determined) monitoring index value, or may be a numerical value larger or smaller than the monitoring index value by a predetermined tolerance. The threshold value thus determined is stored in the memory 30a of the processing system 30. The processing system 30 calculates the monitoring index value during or after polishing of the workpiece W and determines that an abnormality in measuring of the film thickness has occurred when the monitoring index value is below the threshold value or when the monitoring index value is above the threshold value.

Figure 10:
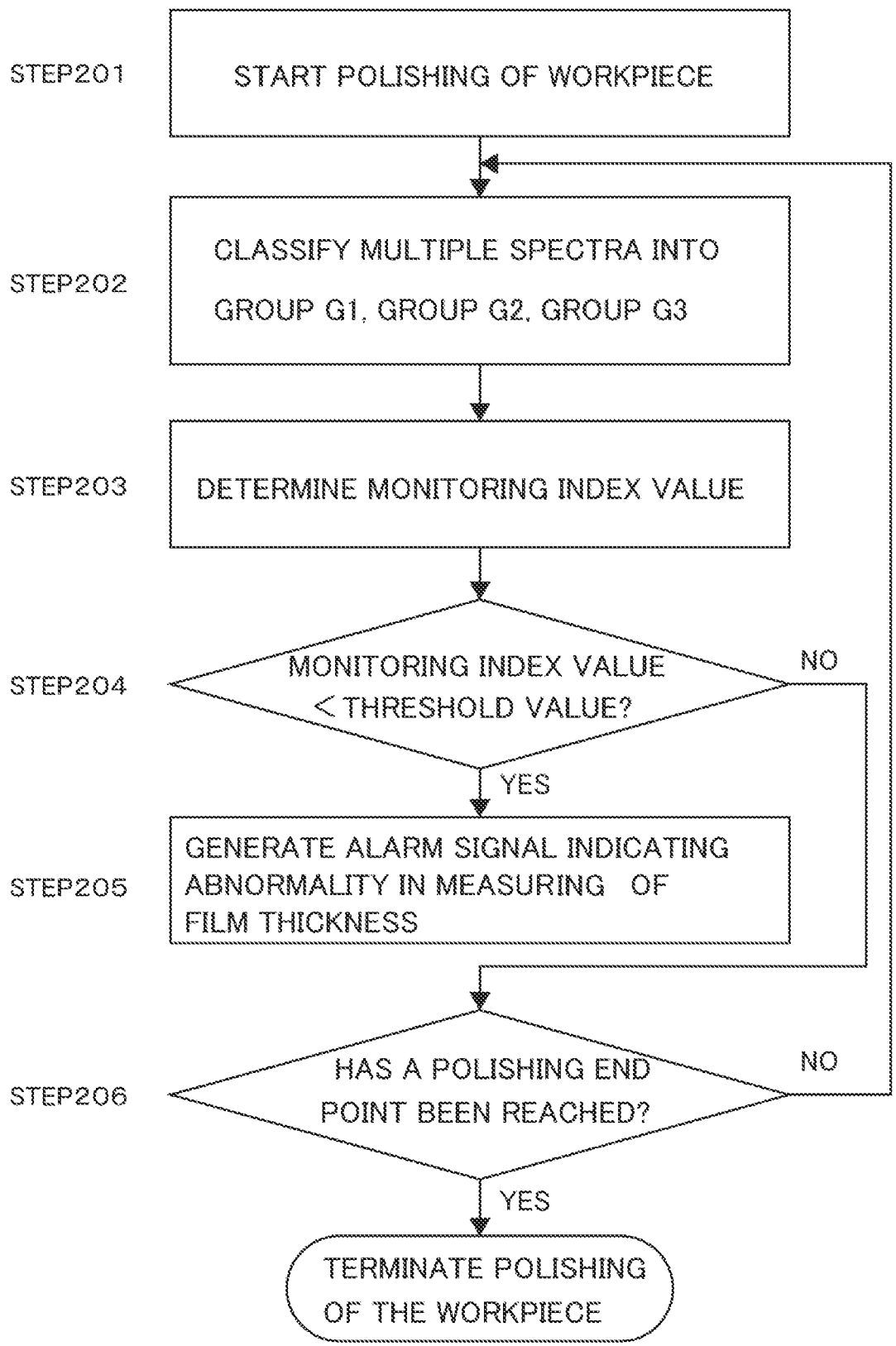
FIG. 10 is a flow chart illustrating an embodiment in which a processing system detects an abnormality in measuring of a film thickness.

FIG. 10 is a flow chart illustrating an embodiment in which the processing system 30 detects an abnormality in measuring of the film thickness.

In step 201, polishing of the workpiece W is started by the polishing apparatus shown in FIGS. 1 and 2.

In step 202, the processing system 30 uses the spectrum classifier to classify multiple spectra generated within the predetermined period of time during polishing of workpiece W into the group G1, the group G2, and the group G3. In this embodiment, the spectrum classifier of the processing system 30 classifies the multiple spectra into the groups G1, G2, and G3 according to the feature of each spectrum. In the embodiment shown in FIG. 10, the predetermined period of time is a time of one rotation of the polishing table.

In step 203, the processing system 30 calculates (determines) the monitoring index value based on at least the number of spectra included in the group G1 (or G3). The monitoring index value is calculated (determined) according to the procedure for calculation (determination) that has been determined in the above-discussed step 105.

In step 204, the processing system 30 determines whether the monitoring index value is below (or above) the threshold value.

In step 205, the processing system 30 generates an alarm signal indicating an abnormality in measuring of the film thickness when the monitoring index value is below (or above) the threshold value.

If the monitoring index value is not below (or not above) the threshold value, in step 206, the processing system 30 determines whether a polishing end point for the workpiece W has been reached. The polishing end point of the workpiece W is, for example, a point in time when the film thickness of the workpiece W has reached a target film thickness. When the polishing end point of the workpiece W has been reached, the processing system 30 sends a polishing end point signal to the operation controller 9, and the operation controller 9 terminates the polishing of the workpiece W performed by the polishing apparatus. If the polishing end point of workpiece W has not been reached, the processing system 30 performs the above-discussed step 202 again.

Figure 11:
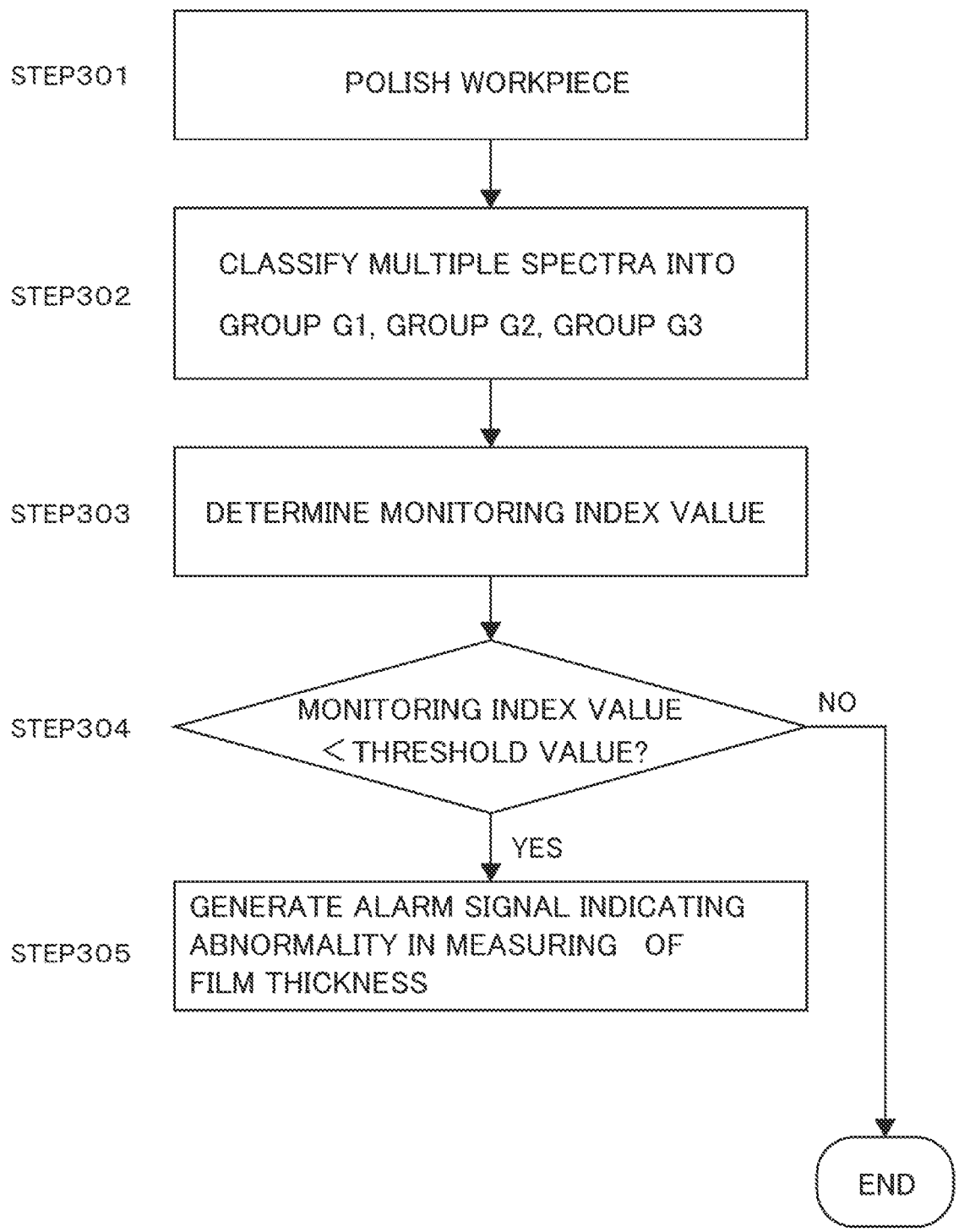
FIG. 11 is a flow chart illustrating another embodiment in which the processing system detects an abnormality in measuring of a film thickness.

FIG. 11 is a flow chart illustrating another embodiment in which the processing system 30 detects an abnormality in measuring of the film thickness.

In step 301, the workpiece W is polished by the polishing apparatus shown in FIGS. 1 and 2.

In step 302, after polishing of workpiece W, the processing system 30 classifies multiple spectra generated within a predetermined period of time during polishing of workpiece W into the group G1, the group G2, and the group G3 using the spectrum classifier. In this embodiment, the spectrum classifier of the processing system 30 classifies the multiple spectra into the groups G1, G2, and G3 according to the feature of each spectrum. In the embodiment shown in FIG. 11, the predetermined period of time is an entire period of time from the start of polishing of the workpiece W to the end point of polishing of the workpiece W.

In step 303, the processing system 30 calculates (determines) the monitoring index value based on at least the number of spectra included in the group G1 (or G3). The monitoring index value is calculated (determined) according to the procedure for calculation (determination) that has been determined in the above-discussed step 105.

In step 304, the processing system 30 determines whether the monitoring index value is below (or above) the threshold value.

In step 305, the processing system 30 generates an alarm signal indicating an abnormality in measuring of the film thickness when the monitoring index value is below (or above) the threshold value. If the monitoring index value is not below (or not above) the threshold value, the processing system 30 terminates the detecting operation of an abnormality in measuring of the film thickness.

In the above-described embodiments, the multiple spectra are classified into three groups, i.e., the group G1, the group G2, and the group G3, while depending on the surface structure of the workpiece W, the multiple spectra may be classified into two groups or four or more groups.

In the embodiment described with reference to FIG. 10, while the workpiece W is being polished, the monitoring index value is compared with the threshold value. During polishing of the workpiece W, the threshold value is constant. As the workpiece W is polished, the film thickness of the workpiece W decreases. The decrease in film thickness may affect the number of spectra included in the group G1 and/or the number of noise spectra included in the group G3. Thus, in one embodiment, the processing system 30 may change the threshold value during polishing of workpiece W in order to eliminate such influence. For example, the processing system 30 may change the threshold value according to a change in the polishing time or a change in film thickness of the workpiece W.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A method of detecting an abnormality in measuring of a film thickness of a workpiece, comprising:
    generating, by an optical film-thickness measuring apparatus, multiple spectra of reflected light from multiple measurement points on at least one workpiece over a predetermined period of time during polishing of the at least one workpiece;
    classifying the multiple spectra into a plurality of groups including at least a first group and a second group according to feature of each of the multiple spectra;
    determining a monitoring index value based on at least the number of spectra included in the first group; and
    detecting an abnormality in measuring of the film thickness of the at least one workpiece based on comparison of the monitoring index value with a threshold value.

2. The method of claim 1, wherein the spectra included in the first group are one of spectra of reflected light from an interconnect pattern region formed on a surface of the at least one workpiece and noise spectra, and spectra included in the second group 2 are other of the spectra of reflected light from the interconnect pattern region and the noise spectra.

3. The method of claim 1, further comprising:

generating multiple sample spectra of reflected light from multiple measurement points of a sample while polishing the sample having the same surface structure as the at least one workpiece;

performing clustering on the multiple sample spectra to classify the multiple sample spectra into sample groups;

creating a spectrum classifier based on features of the multiple sample spectra that have been classified into the sample groups, the spectrum classifier being configured to classify a new spectrum according to a feature of the new spectrum into one of sample groups including at least a first sample group and a second sample group; and determining the threshold value based on the number of sample spectra included in at least the first sample group.

4. The method of claim 3, wherein classifying the multiple spectra into the plurality of groups including at least the first group and the second group according to the feature of each of the multiple spectra comprises classifying the multiple spectra by the spectrum classifier into the plurality of groups including at least the first group and the second group.

5. The method of claim 1, wherein the monitoring index value is one of the number of spectra included in the first group, a ratio of the number of spectra included in the first group to the number of spectra included in the second group, a ratio of the number of spectra included in the second group to the number of spectra included in the first group, and a ratio of the number of spectra included in the first group to the total number of spectra generated in the predetermined period of time.

6. The method of claim 1, wherein the predetermined period of time during polishing of the at least one workpiece is an entirety or a part of a period of time from start of polishing of the at least one workpiece to end of polishing of the at least one workpiece.

7. The method of claim 1, wherein the predetermined period of time during polishing of the at least one workpiece is an entire period of polishing of a plurality of workpieces.

8. The method of claim 1, wherein the threshold value changes during polishing of the at least one workpiece.

9. An optical film-thickness measuring apparatus for measuring a film thickness of a workpiece, comprising:

a processing system configured to detect an abnormality in measuring of the film thickness of the workpiece, the processing system being configured to generate multiple spectra of reflected light from multiple measurement points on at least one workpiece over a predetermined period of time during polishing of the at least one workpiece, classify the multiple spectra into a plurality of groups including at least a first group and a second group according to feature of each of the multiple spectra, determine a monitoring index value based on at least the number of spectra included in the first group, and detect an abnormality in measuring of the film thickness of the at least one workpiece based on comparison of the monitoring index value with a threshold value.

10. A computer-readable storage medium storing a program for causing a computer to execute:

generating multiple spectra of reflected light from multiple measurement points on at least one workpiece over a predetermined period of time during polishing of the at least one workpiece;

classifying the multiple spectra into a plurality of groups including at least a first group and a second group according to feature of each of the multiple spectra;

determining a monitoring index value based on at least the number of spectra included in the first group; and detecting an abnormality in measuring of the film thickness of the at least one workpiece based on comparison of the monitoring index value with a threshold value.

* * * * *